United States Patent [19]
Freedman

[11] Patent Number: 5,595,332
[45] Date of Patent: Jan. 21, 1997

[54] STRAP COVER AND METHOD OF MAKING THE SAME

[76] Inventor: Franceslynn Freedman, Easy Hill Farm, R.R. 2, Box 134, Verbank, N.Y. 12585

[21] Appl. No.: 384,852

[22] Filed: Feb. 7, 1995

[51] Int. Cl.$^6$ ............................................. B60R 22/00
[52] U.S. Cl. ........................................................ 224/264
[58] Field of Search ............................................. 224/264

[56] References Cited

U.S. PATENT DOCUMENTS

| | | |
|---|---|---|
| D. 275,153 | 8/1984 | Weinreb . |
| D. 298,386 | 11/1988 | Hirahara . |
| D. 308,287 | 6/1990 | Miller et al. . |
| D. 317,829 | 7/1991 | Willett et al. . |
| 2,643,380 | 6/1953 | Blair . |
| 2,676,737 | 4/1954 | Zirbel ........................................ 224/264 |
| 4,348,037 | 9/1982 | Law et al. . |
| 4,619,468 | 10/1986 | Spill . |
| 4,678,205 | 7/1987 | Wold . |
| 4,693,495 | 9/1987 | LaPointe . |
| 4,699,401 | 10/1987 | Saenz . |
| 4,741,574 | 5/1988 | Weightman et al. . |
| 4,795,190 | 1/1989 | Weightman et al. . |
| 4,879,768 | 11/1989 | McClees et al. ........................ 224/264 X |
| 4,929,027 | 5/1990 | Beauvias, II . |
| 4,978,044 | 12/1990 | Silver ........................................ 224/264 X |
| 5,016,915 | 5/1991 | Perry . |
| 5,172,428 | 12/1992 | Leinoff ..................................... 224/264 X |
| 5,203,482 | 4/1993 | Puff ......................................... 224/264 X |
| 5,322,349 | 6/1994 | Gianino . |

FOREIGN PATENT DOCUMENTS

| | | |
|---|---|---|
| 2624458 | 6/1989 | France . |
| 1581996 | 12/1980 | United Kingdom . |

*Primary Examiner*—Renee S. Luebke
*Attorney, Agent, or Firm*—Watov & Kipnes, P.C.

[57] ABSTRACT

Cover for securing about a strap of a strap-bearing device and method of forming the same including a sleeve for receiving the strap therein and a support layer for cushioning the strap against the user, the sleeve and support layer being made from a single piece of material.

8 Claims, 2 Drawing Sheets

5,595,332

STRAP COVER AND METHOD OF MAKING THE SAME

TECHNICAL FIELD

The present invention is directed to a cover which overlays a strap. The covered strap is employed by the user to carry a strap-bearing article such as a piece of luggage or as part of a restraint system. The cover is made of a continuous piece of material folded upon itself to define a sleeve for receiving the strap and a support layer below the sleeve for cushioning the strap against the user.

BACKGROUND OF THE INVENTION

Numerous articles are carried by consumers through the use of straps which may be placed on the shoulder. Such articles include luggage, brief cases and the like. In addition, straps or belts are customarily used as part of automobile restraint systems. In both cases, sufficient stress may be placed on the straps so as to cause discomfort to the user.

Efforts have been made to provide covers for the straps which cushion the user from the strap or otherwise provide a layer of protection against chaffing or pressure brought by the strap against the user, such as in the shoulder area. However, conventional covers have proven less than satisfactory because they are cumbersome or too expensive to manufacture. One of the reasons for costly manufacture is that the covers are typically composed of multiple components which must be sewn, glued or otherwise connected together. Such components typically include, but are not limited to a sleeve for receiving the strap and one or more protective layers.

It would be a significant advance in the art of strap covers if a cover for a strap-bearing device could be assembled out of a continuous piece of material so as to avoid the costly manufacturing operations associated with connecting multiple components together.

SUMMARY OF THE INVENTION

The present invention is generally directed to a cover which fits around a strap for providing protection against stress exerted on the strap by the weight or force of the device to which the strap is attached. More specifically, the present invention is directed to a cover for securing about a strap of a strap-bearing device comprising:

a) a sleeve for placing about the strap; and b) a support layer beneath the sleeve and adapted when stress is applied to the strap, to prevent the strap from causing irritation to the user, said sleeve and said support layer being composed of a continuous sheet of material.

In a preferred form of the invention, the support layer is comprised of a padded material or includes a chamber containing a padding which is secured therein to provide additional cushioning for the strap. Methods of making the strap cover are also within the purview of the present invention.

BRIEF DESCRIPTION OF THE DRAWINGS

The following drawings in which like reference characters indicate like parts are illustrative of embodiments of the invention and are not intended to limit the invention as encompassed by the claims forming part of the application.

DETAILED DESCRIPTION OF THE INVENTION

Figure 1:
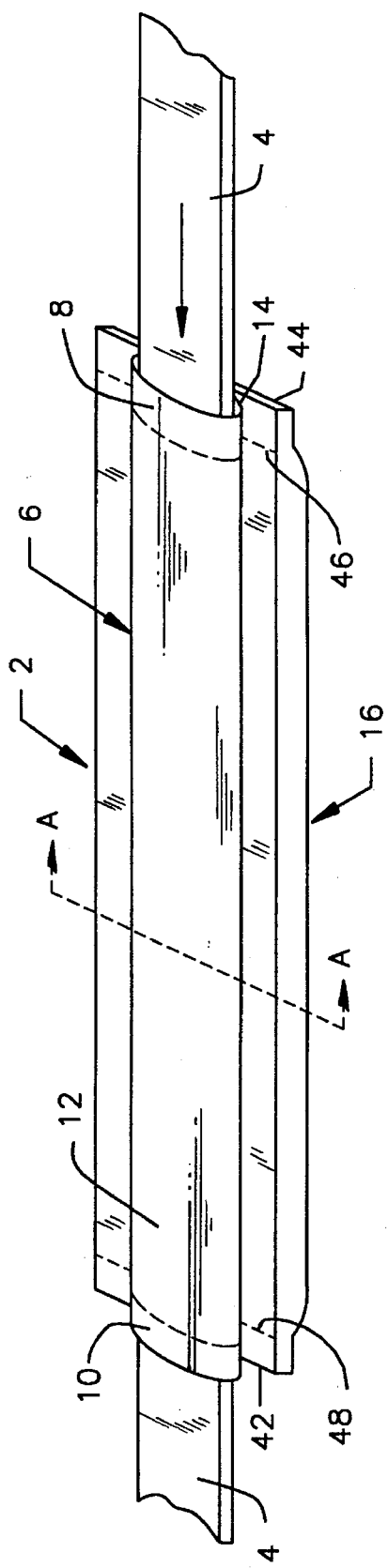
FIG. 1 is a perspective view of one embodiment of the cover of the present invention.

Referring to the drawings and first to FIG. 1, there is shown a cover 2 of the present invention housing a strap 4 which is attached to a strap-bearing device such as a piece of luggage, a shoulder bag, a seat belt or the like (not shown).

The cover 2 includes a sleeve 6 having opposed open ends 8, 10 through which the strap 4 extends. The sleeve has a top side 12, and a bottom side 14 contiguous with a support layer 16. The support layer 16 is positioned against the user so as to provide protection against irritation, chaffing and the like caused by stress exerted on the strap by the strap-bearing device.

Figure 2:
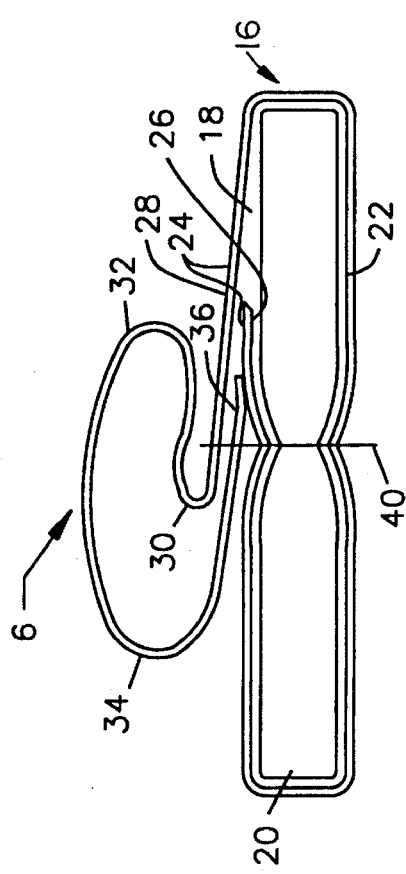
FIG. 2 is a cross-sectional view taken along line A—A of FIG. 1.

The support layer 16 may be made of a padded material or as best shown in FIG. 2 includes a chamber 18 for optionally housing a padding material 20. The chamber 18 has a bottom surface 22 which lies against or comes into contact with the user and an upper surface 24 which interfaces with the bottom side 14 of the sleeve 6.

The cover 2 of the present invention as shown specifically in FIG. 2 is constructed of a continuous sheet of material. The preferred materials include nylon, cotton fabric and the like including, for example, Propex (made by Starensier) and Cordura (made by DuPont).

The term "continuous" sheet of material shall include a single piece of material having opposed ends or multiple pieces of material connected along respective ends by sewing, heat sealing and the like to form a continuous sheet having opposed ends. The use of multiple pieces of material allows covers of the present invention to be made of more than one material and/or color. It will be understood, however, that whether the continuous sheet of material is composed of a single piece or multiple pieces of material, the sleeve 6 and the support layer 16 are formed from the same continuous sheet of material.

Figure 4:
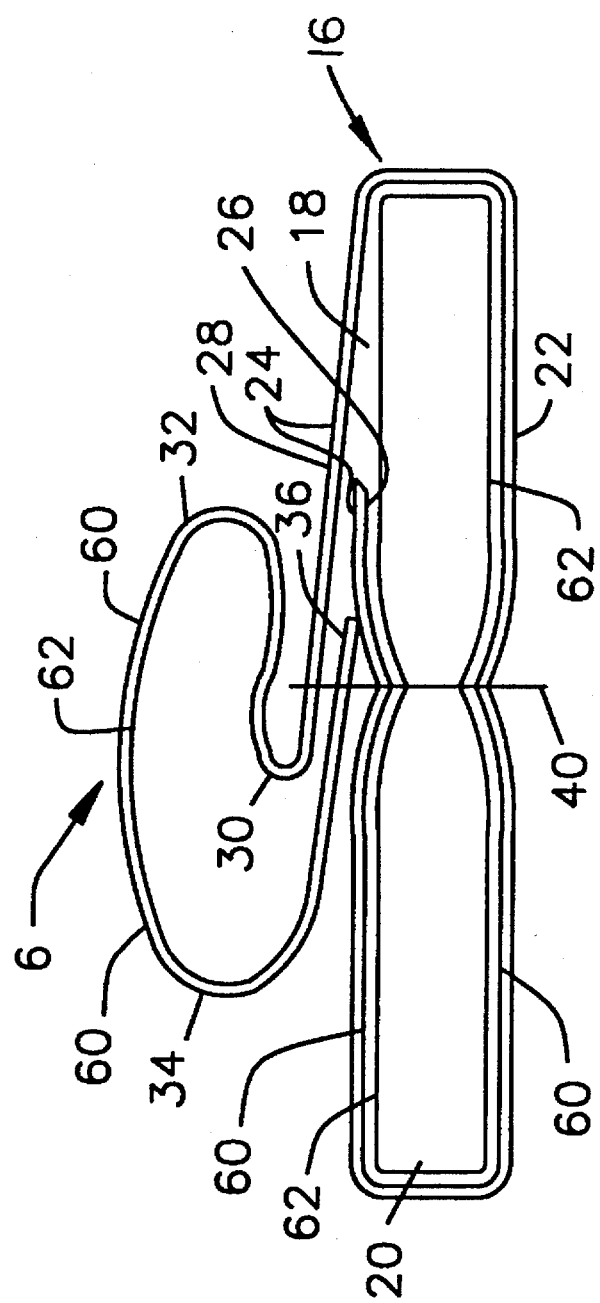
FIG. 4 is a cross-sectional view similar to FIG. 2 showing the use of multiple pieces of material.

As previously indicated, the continuous sheet of material includes multiple pieces of material connected along respective ends by sewing, heat sealing and the like. Referring to FIG. 4 there is shown an embodiment of the invention wherein the continuous sheet of material which forms the sleeve 6 and the chamber 18 is comprised of pieces of material 60 joined together at respective ends 62 by a sewn seam, a heat seal and the like. In this embodiment of the invention the individual pieces of material may be the same or may be different.

The cover 2 may be constructed in the following manner. Referring to FIG. 2, one end 26 of the material is held in place and the material is wrapped around the padding 20 in a counterclockwise direction until there is an overlap at location 28. The material is then rotated in a clockwise direction to form a bend 30 which commences the formation of the sleeve 6. The material is then turned again in a counterclockwise direction to form a bend 32 and changes direction again to form a bend 34. The opposed end 36 of the material is then placed proximate to the first end 26 and connected thereto by gluing, sewing and the like. As a result, the sleeve 6 is operatively connected to the support layer 16 including optional padding 20.

As shown in FIG. 2, the ends 26 and 36 may be secured by a sewn seam 40 which secures the sleeve 6 in place on the support layer 16. The seam 40 may be provided along all or a portion of the longitudinal axis of the sleeve 6 and may be also used to attach the padding 20 within the chamber 18.

In still a further embodiment, as best shown in FIG. 1, at least one of the opposed ends 42, 44 of the support layer 16 is sewn closed by seams 46, 48, respectively which are provided transverse to the longitudinal axis of the sleeve 6. The seams 46, 48 enclose the chamber 18 to secure the padding 20 therein. In the embodiment shown in FIG. 1, the strap 4 is inserted into one of the ends of the sleeve and exits the opposed end to render the cover operational.

Figure 3:
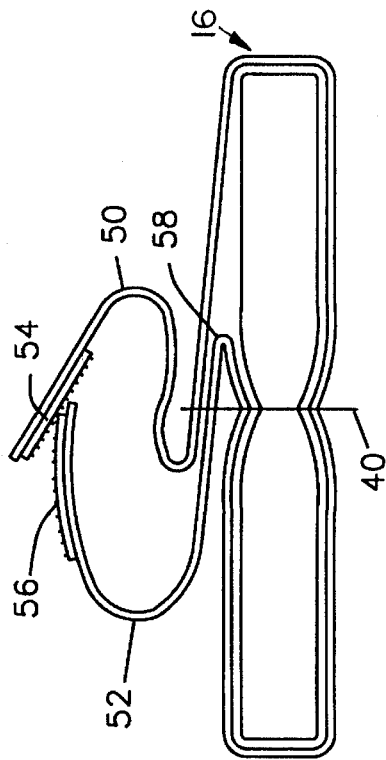
FIG. 3 is a cross-sectional view of another embodiment of the cover of the present invention in which the sleeve may be opened along the longitudinal axis thereof.

Referring to FIG. 3, there is shown an embodiment of the cover of the invention wherein the sleeve 6 is split into opposed sides 50, 52 having longitudinally extending edges which are releasably connectable by a suitable fastening device. As shown specifically in FIG. 3, the sides 50, 52 are provided with hooks 54 and eyes 56, such as Velcro. By opening the sleeve 6 through the detachment of the fastening means, the strap may be easily placed within the sleeve.

The embodiment of FIG. 3 is constructed in a manner similar to that described in connection with FIG. 2 except the respective opposed ends of the material are positioned at the top surface of the sleeve. Accordingly, the ends 26 and 36 shown in FIG. 2 are eliminated and are therefore not physically attached together by gluing, sewing or the like. Instead, the material is formed into an additional bend 58. The ends of the continuous sheet of material are thereby extended to form the upper surface of the sleeve 6 by the joining of the opposed sides 50 and 52.

What is claimed is:

1. A cover for securing around a strap of a strap-bearing device comprising:
    a) a sleeve slidably mounted around the strap comprising a first opening for receiving an end of the strap and an opposed opening enabling the end of the strap to exit the sleeve so that the sleeve is slidably mounted around the strap when the cover is operatively engaged to the strap-bearing device;
    b) a support layer including a chamber containing a padding material beneath the sleeve and positioned between the strap and a user; and
    c) securing means for securing the sleeve to the support layer, said sleeve and said support layer being formed of a continuous sheet of material.

2. The cover of claim 1 wherein the securing means comprises a sewn seam along a longitudinal axis of the support layer.

3. The cover of claim 1 wherein the continuous sheet of material comprises multiple pieces of material connected at respective ends thereof.

4. The cover of claim 3 wherein the multiple pieces are made of different materials.

5. The cover of claim 1 wherein the sleeve comprises opening means for reversibly opening the sleeve along a longitudinal axis thereof to enable the strap to be inserted therein.

6. The cover of claim 5 wherein the sleeve opening means comprises said sleeve having opposed longitudinal extending edges and hook and eye fasteners on the respective edges which releasably engage each other.

7. The cover of claim 1 wherein at least one of the opposed ends of the chamber is closed.

8. The cover of claim 7 wherein at least one of the opposed ends of the chamber has a sewn seam transverse to the longitudinal axis of the support layer.

* * * * *